US010367446B2

(12) United States Patent
Tanaka

(10) Patent No.: US 10,367,446 B2
(45) Date of Patent: Jul. 30, 2019

(54) MOUNT FOR SOLAR PANEL

(71) Applicants: FUJI SEIKO CO., LTD., Hashima-shi (JP); FUJI SHOJI CO., LTD., Hashima-shi (JP)

(72) Inventor: Tatsumi Tanaka, Hashima (JP)

(73) Assignees: FUJI SEIKO CO., LTD., Hashima-shi (JP); FUJI SHOJI CO., LTD., Hashima-shi (JP)

(*) Notice: Subject to any disclaimer, the term of this patent is extended or adjusted under 35 U.S.C. 154(b) by 0 days.

(21) Appl. No.: 15/574,025

(22) PCT Filed: May 19, 2015

(86) PCT No.: PCT/JP2015/064284
§ 371 (c)(1),
(2) Date: Nov. 14, 2017

(87) PCT Pub. No.: WO2016/185555
PCT Pub. Date: Nov. 24, 2016

(65) Prior Publication Data
US 2018/0302023 A1    Oct. 18, 2018

(51) Int. Cl.
F24J 2/52        (2006.01)
H02S 20/30       (2014.01)
F24S 30/425      (2018.01)
F24S 25/13       (2018.01)
F24S 25/70       (2018.01)
(Continued)

(52) U.S. Cl.
CPC ............. *H02S 20/30* (2014.12); *F16M 11/10* (2013.01); *F24S 25/13* (2018.05); *F24S 25/70* (2018.05); *F24S 30/425* (2018.05); *F24S 25/20* (2018.05); *F24S 25/61* (2018.05); *F24S 25/65* (2018.05); *F24S 2025/018* (2018.05); *F24S 2030/18* (2018.05); *Y02E 10/47* (2013.01)

(58) Field of Classification Search
CPC ......... Y02B 10/12; H02S 20/23; H02S 20/00; F24S 25/61; F24S 25/20
(Continued)

(56) References Cited

U.S. PATENT DOCUMENTS

| 5,988,578 | A  | * | 11/1999 | Davies  | E04D 15/02 248/237 |
| 6,046,399 | A  | * | 4/2000  | Kapner  | H02S 20/23 136/244 |
| 6,745,869 | B2 | * | 6/2004  | Garrett | B23D 45/003 182/45 |
| 8,650,812 | B2 | * | 2/2014  | Cusson  | H02S 20/30 52/173.3 |

(Continued)

FOREIGN PATENT DOCUMENTS

| JP | 2005-64147 A  | 3/2005 |
| JP | 2006-278738 A | 10/2006 |

(Continued)

OTHER PUBLICATIONS

International Search Report dated Jul. 28, 2015 in PCT/JP2015/064284 filed May 19, 2015.

*Primary Examiner* — Steven M Marsh
(74) *Attorney, Agent, or Firm* — Oblon, McClelland, Maier & Neustadt, L.L.P.

(57) ABSTRACT

A mount for a solar panel capable of changing a tilt angle of the solar panel easily and positively, includes a tilted support frame including a pair of horizontal members extending along a horizontal direction in parallel with different heights and a pair of tilted members arranged between the horizontal members and extending in parallel to be tilted in one side, a fixed support member fixing and supporting the tilted (Continued)

support frame, a square-shaped panel support member on which a solar panel is fixed, a support shaft extending between the tilted support frame and the panel support member and supporting the panel support member to rotate, and a pair of stopper members respectively provided on both rotating end sides of the panel support member so that one end portions rotate freely and including engaging concave portions engaged with half circumferences of outer peripheries of the horizontal members.

20 Claims, 7 Drawing Sheets

(51) Int. Cl.
| | | |
|---|---|---|
| *F16M 11/10* | (2006.01) | |
| *F24S 25/65* | (2018.01) | |
| *F24S 25/61* | (2018.01) | |
| *F24S 25/20* | (2018.01) | |
| *F24S 25/00* | (2018.01) | |
| *F24S 30/00* | (2018.01) | |

(58) Field of Classification Search
USPC .......................................... 248/237; 52/173.3
See application file for complete search history.

(56) References Cited

U.S. PATENT DOCUMENTS

| | | | | |
|---|---|---|---|---|
| 8,661,747 | B2* | 3/2014 | Eide | E04D 13/031 |
| | | | | 52/173.3 |
| 9,038,329 | B2* | 5/2015 | Pelman | H02S 20/30 |
| | | | | 52/173.3 |
| 9,093,948 | B2* | 7/2015 | Walz | H02S 20/24 |
| 9,157,664 | B2* | 10/2015 | Place | F24S 25/70 |
| 9,395,103 | B2* | 7/2016 | Conley | H02S 20/30 |
| 2008/0105489 | A1* | 5/2008 | Garrett | E04D 15/00 |
| | | | | 182/45 |

FOREIGN PATENT DOCUMENTS

| | | |
|---|---|---|
| JP | 2011-82433 A | 4/2011 |
| JP | 2013-168627 A | 8/2013 |
| JP | 2013-531885 A | 8/2013 |
| WO | 2011/155658 A1 | 12/2011 |

\* cited by examiner

MOUNT FOR SOLAR PANEL

TECHNICAL FIELD

The present invention relates to a mount used for supporting a solar panel.

BACKGROUND ART

In recent years, solar power generation is considered as one of power generation using natural energy not having problems in depletion of resources and not polluting environment.

In the solar power generation, when light is applied to cells as unit elements of a solar battery, light energy is absorbed into electrons contained in the cells. When light energy is absorbed into electrons, light energy is directly converted into electric power by photovoltaic effect and is outputted to the outside as electric power.

A device in which plural cells are arranged and protected by resin or reinforced glass and packaged so as to be used outdoors is called a solar panel (module).

Then, it is necessary that the solar panel absorbs solar energy efficiently, therefore, a mount for the solar panel that supports the solar panel so that the solar panel faces a direction in which the sunlight is received at the maximum is very important.

A mount for a solar panel described in Patent Literature 1 is provided with a supporting unit on which the solar panel is installed, a column for swinging supporting the supporting unit so as to swing, a sliding pillar supporting the supporting unit while being elongated and contracted associated with the swing of the supporting unit, an angle adjustment driving unit tilting the supporting unit at a predetermined tilt angle and a fixing means for fixing the supporting unit and the sliding pillar at predetermined positions.

The tilt angle of the solar panel can be easily adjusted stably by driving the angle adjustment driving unit even when the solar panel has a large area.

A tilt-angle manual adjustment apparatus for a solar battery panel described in Patent Literature 2 includes a torque tube on which the solar battery panel is installed and rotation shafts of which are arranged on both ends and inserted into bearings to be rotated, tilt angle adjustors installed to be fixed on bottom surfaces of both ends of the torque tube so as to be horizontal and at right angle to the torque tube as well as portions between bolt holes on both ends are fixed so that the bolt holes formed on both sides are exposed, and a rotation installation stoppers supporting and rotating the tilt angle adjustors at the time of adjusting the tilt angle of the solar battery panel by rotation of the torque tube and having bolt holes corresponding to bolt holes on both sides of the rotated tilt angle adjustors to be fixed to both side surfaces of upper sides of vertical supports.

The torque tube is rotated manually by the rotation shafts inserted into the bearings to the first stopper's side or the second stopper's side to adjust the tilt angle of the solar battery panel manually in accordance with variation in altitude of the sun.

CITATION LIST

Patent Literature

Patent Literature 1: JP2005-64147A
Patent Literature 2: JP2013-531885A

SUMMARY OF INVENTION

Technical Problem

However, in the mount for the solar panel according to Patent Literature 1, there is a problem that it is necessary to fix both the supporting unit and the sliding pillar by different fixing means after adjusting the tilt angle, which complicates the work.

Also in the tilt-angle manual adjustment apparatus for the solar battery panel according to Patent Literature 2, the torque tube is rotated to the first stopper's side or the second stopper's side while adjusting fastening of four bolts. Accordingly, for example, two bolts on the first stopper's side are loosened and two bolts on the second stopper's side are fastened. Furthermore, lengths of respective paired two-bolts to be fastened are different on the first stopper's side and the second stopper's side, adjustment is required. There is a problem that the tilt angle is adjusted while performing such complicated work.

The present invention has been made in view of the above problems in related art, and an object thereof is to provide a mount for a solar panel capable of changing a tilt angle of the solar panel easily and positively without requiring the complicated work.

Solution to Problem

A mount for a solar panel includes a tilted support frame having a pair of horizontal members extending along a horizontal direction in parallel to each other with different heights and a pair of tilted members arranged between the horizontal members and extending in parallel to each other so as to be tilted in one side, a fixed support member fixing and supporting the tilted support frame on an installation surface, a square-shaped panel support member provided above the tilted support frame, on which a solar panel is arranged and fixed, a support shaft provided so as to extend along a direction parallel to the horizontal members between the tilted support frame and the panel support member and supporting the panel support member so as to rotate at central portions of two facing sides of the panel support member and a pair of stopper members respectively provided on both rotating end sides of the panel support member so that one end portions rotate freely and having the engaging concave portions lower sides of which open and engaged with half circumferences of outer peripheries of the horizontal members from above in a rotating direction so as to be removed at positions corresponding to a predetermined tilt angle position of the panel support member.

Advantageous Effects of Invention

According to the above, the panel support member on which the solar panel is arranged and fixed is supported by the support shaft provided between the tilted support frame and the panel support member so as to rotate at central portions. Accordingly, the operator can tilt the panel support member at a necessary tilt angle without requiring a large force.

When the panel support member is at a predetermined tilt angle, corresponding engaging concave portions of the stopper members are assigned to the horizontal members, and the stopper members rotate downward and the engaging concave portions are engaged with the horizontal members. At the time of stopping the rotation of the panel support member, a force in a direction along the axial direction of the stopper members acts on the stopper members from the horizontal members. However, the engaging concave portions of the stopper members are engaged with the half circumferences of outer peripheries of the horizontal members, therefore, the force acting on the axial direction of the stopper member is received by opening edge portions of the engaging concave portions and engagement between the engaging concave portions and the horizontal members are not released.

As described above, the panel support member can be tilted easily without requiring a large force. Then, the solar panel can be positively supported so as to face a direction in which the sunlight is received at the maximum.

DESCRIPTION OF EMBODIMENTS

First Embodiment

A first embodiment of a mount for a solar panel according to the present invention will be explained with reference to FIG. 1 to FIG. 10.

Figure 1:
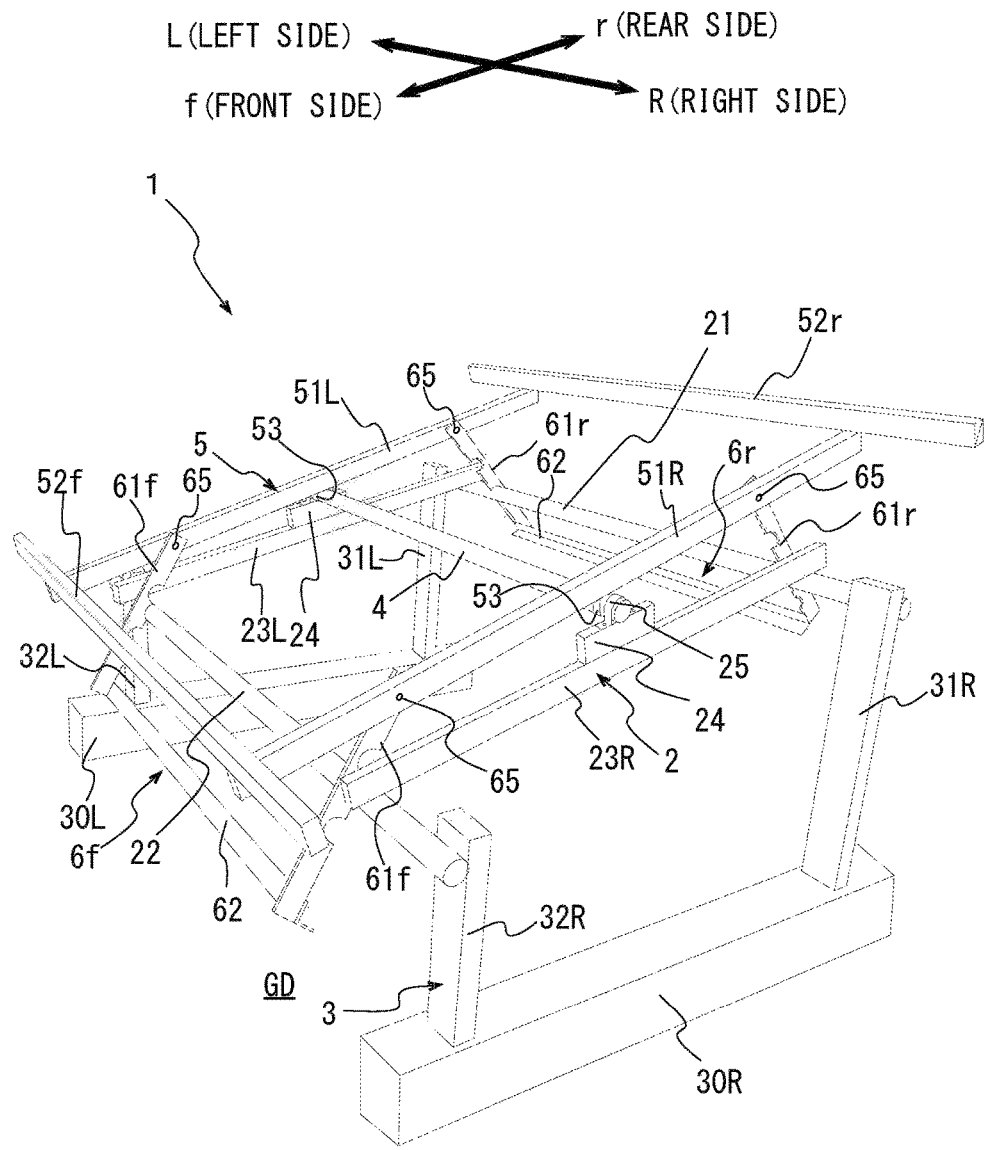
FIG. 1 is an outline view showing the entire structure of a mount for a solar panel according to the present invention as a perspective view.

As shown in FIG. 1, a mount for a solar panel 1 includes a tilted support frame 2, a fixed support member 3 fixing and supporting the tilted support frame 2 on an installation surface GD, a support shaft 4 provided in the tilted support frame 2, a panel support member 5 supported by the support shaft 4 so as to rotate, and stopper members 6*f* and 6*r* stopping the rotation of the panel support member at a predetermined tilt angle position of the panel support member 5. In FIG. 1, the right side is represented by R, the left side is represented by L, the front side is represented by "f" and the rear side is represented by "r".

The fixed support member 3 fixing and supporting the tilted support frame 2 includes two pedestals 30R and 30L placed at a predetermined interval, a pair of first columns 31R and 31L respectively standing on the other end side (rear side) of the respective pedestals 30R and 30L and a pair of second columns 32R and 32L respectively standing on one end side (front side) of the respective pedestals 30R and 30L, which are provided to be lower in height than the first columns 31R and 31L.

The two pedestals 30R and 30L are provided, for example, so as to be parallel to each other on the installation surface at a predetermined interval in a state where heavy thick I-shaped steel materials are laid. On upper surfaces on the other end side (rear side in FIG. 1) of the two pedestals 30R and 30L, the first columns 31R and 31L formed of, for example, I-shape steel materials with intermediate thickness respectively stand in a state where lower end portions are welded by welding.

On upper surfaces of one end side (front side in FIG. 1) of the two pedestals, the second columns 32R and 32L formed of, for example, I-shape steel materials with intermediate thickness respectively stand in a state where lower end portions are welded by welding.

The tilted support frame 2 includes an upper horizontal member 21 horizontally arranged between the pair of the first columns 31R and 31L, a lower horizontal member 22 horizontally arranged between the pair of the second columns 32R and 32L and a pair of tilted members 23R and 23L arranged between both ends of the upper horizontal member 21 and the lower horizontal member 22. The upper horizontal member 21 and the lower horizontal member 22 are arranged at uneven height positions with different heights so as to extend along the horizontal direction. The tilted members 23R and 23L extend in parallel with each other so as to tilt to one side (the second columns 32R, 32L side). These upper horizontal member 21 and the lower horizontal member 22 correspond to horizontal members.

The upper/lower horizontal members 21 and 22 are formed of, for example, bar-shaped materials with a circular shape in cross section. The upper horizontal member 21 is welded at end portions thereof respectively, for example, by welding or the like on upper rear-side surfaces of the first columns 31R and 31L to be horizontally arranged between the first columns 31R and 31L which face each other. The lower horizontal member 22 is welded at end portions respectively, for example, by welding or the like on upper front-side surfaces of the second columns 32R and 32L to be horizontally arranged between the second columns 32R and 32L which face each other.

The pair of tilted members 23R and 23L are formed of, for example, thinner I-shaped steel materials. In the pair of tilted members 23R and 23L, lower end surfaces of tilted upper portions are welded on upper surfaces on both end sides of the upper horizontal member 21, and lower end surfaces of tilted lower portions are welded on upper surfaces on both end sides of the lower horizontal member 22 respectively, for example, by welding or the like.

On upper surfaces of intermediate portions of the pair of tilted members 23R and 23L, bulk auxiliary members 24 having a rectangular parallelepiped shape are respectively welded. A support shaft 4 formed of a bar-shaped material with a circular shape in cross section is fixed on upper surfaces of respective bulk auxiliary members 24 by brackets and screws for supporting an outer periphery of the support shaft 4. The support shaft 4 is supported so as to extend along a direction parallel to the upper/lower horizontal members 21 and 22.

Figure 2:
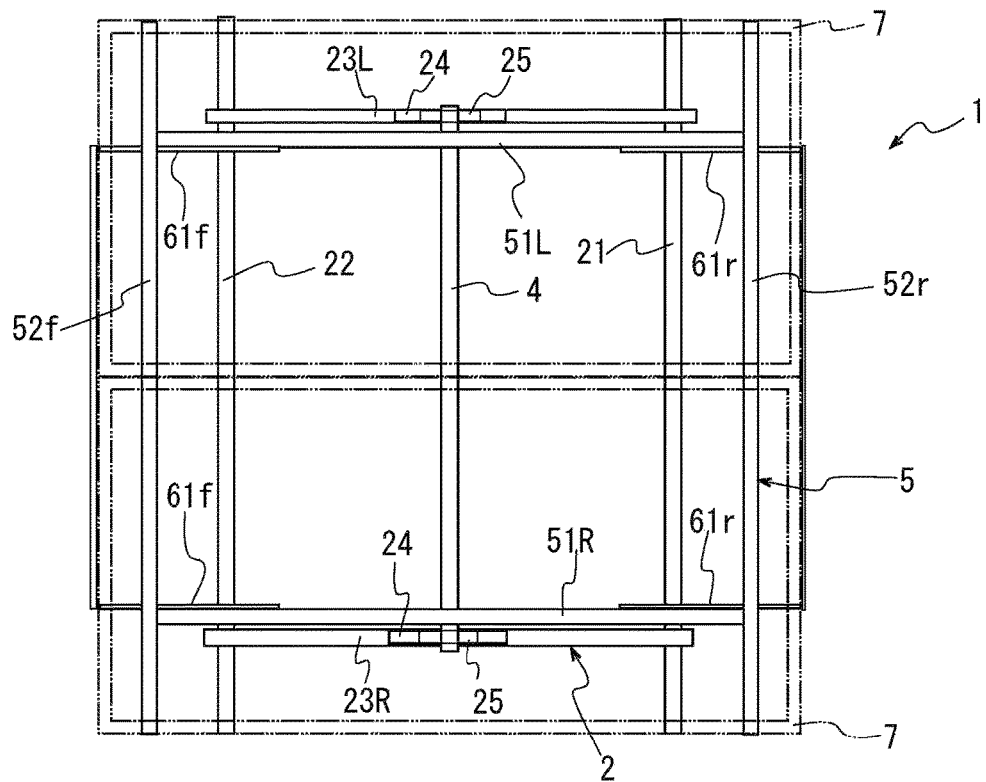
FIG. 2 is a plan view showing part of an upper side of a mount for a solar panel.

The panel support member 5 is formed in a square shape by including a pair of rotating bar members 51R and 51L (corresponding to two facing sides) supported by the support shaft 4 at centers thereof and a pair of panel fixing members 52*f* and 52*r* extending in a direction parallel to the upper/lower horizontal members 21, 22 and horizontally arranged on both end portions of the rotating bar members 51R and 51L. Bearing members 53 abutting on outer peripheral surfaces of the support shaft 4 are provided on undersurfaces of central portions of the rotating bar members 51R and 51L. The bearings 53 support the outer periphery of the support shaft 4 so as to rotate by strip-shaped holding portions and screws. As shown in FIG. 2, two pieces of solar panels 7 are fixed to the panel fixing members 52*f* and 52*r* by, for example, bolts or the like.

Figure 7:
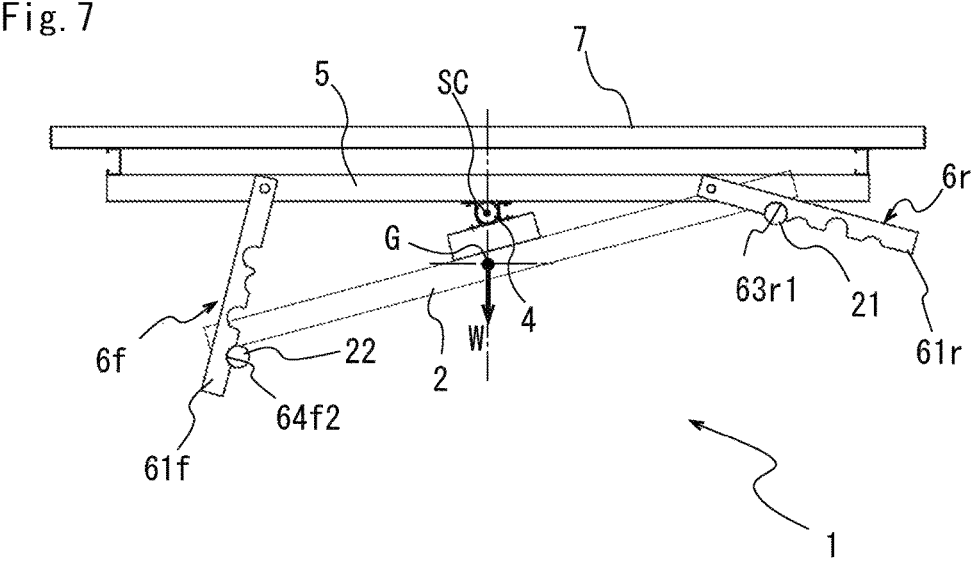
FIG. 7 is a view showing a case where the panel support member is supported at a tilt angle of 0 (zero) degree.

A combined center of gravity G is formed by combining respective centers of gravity of the panel support member 5, the stopper members 6*f*, 6*r* and the solar panels 7 as shown in FIG. 7. A total weight W of the panel support member 5, the stopper members 6*f*, 6*r* and the solar panels 7 act on the combined center of gravity G. The combined center of gravity G according to the embodiment is set to a predetermined position just under the support shaft 4 to be a center of rotation SC when the panel support member 5 is balanced at a horizontal position.

Figure 5:
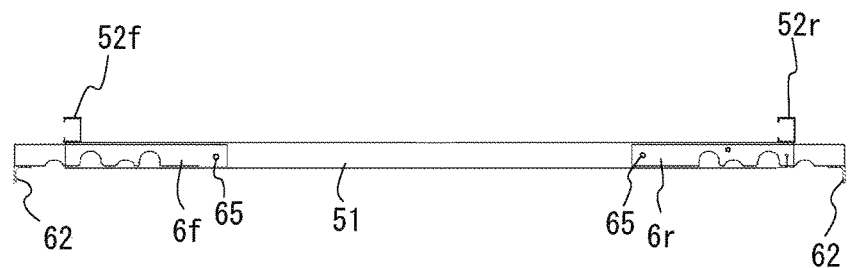
FIG. 5 is an outline view showing a structure of a rotating bar member and stopper members in a panel support member.

The stopper members 6*f* and 6*r* are provided on respective both end sides of the rotating bar members 51R and 51L. The stopper members 6*f* and 6*r* each have a pair of long plate-shaped portions 61*f* and 61*r* respectively arranged facing to each other and a connecting member 62 connecting between tip ends of the long plate-shaped portions 61*f* and 61*r*. One-end portions of the long plate-shaped portions 61*f* and 61*r* of the stopper members 6*f* and 6*r* are connected to the rotating-bar members 51R and 51L so as to rotate by pins 65, as shown in FIG. 1 and FIG. 5. The other-end portions of the long plate-shaped portions 61*f* and 61*r* are connected by the connecting members 62 extending along a direction in which the upper/lower horizontal members 21 and 22 extend. As the connecting member 62, for example, an angle steel material is used.

Figure 3:
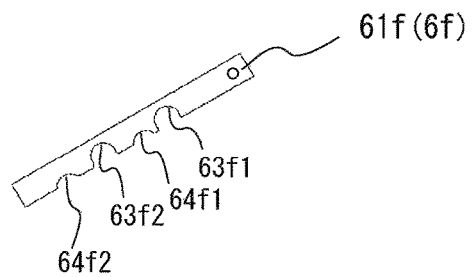
FIG. 3 is an outline view showing long plate-shaped engaging concave portions and shallow engaging concave portions on the front side.
Figure 4:
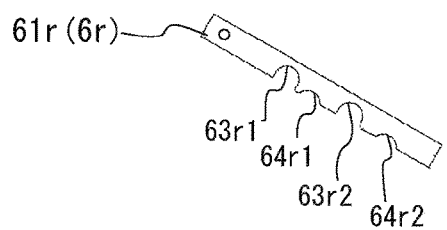
FIG. 4 is an outline view showing long plate-shaped engaging concave portions and shallow engaging concave portions on the rear side.
Figure 6:
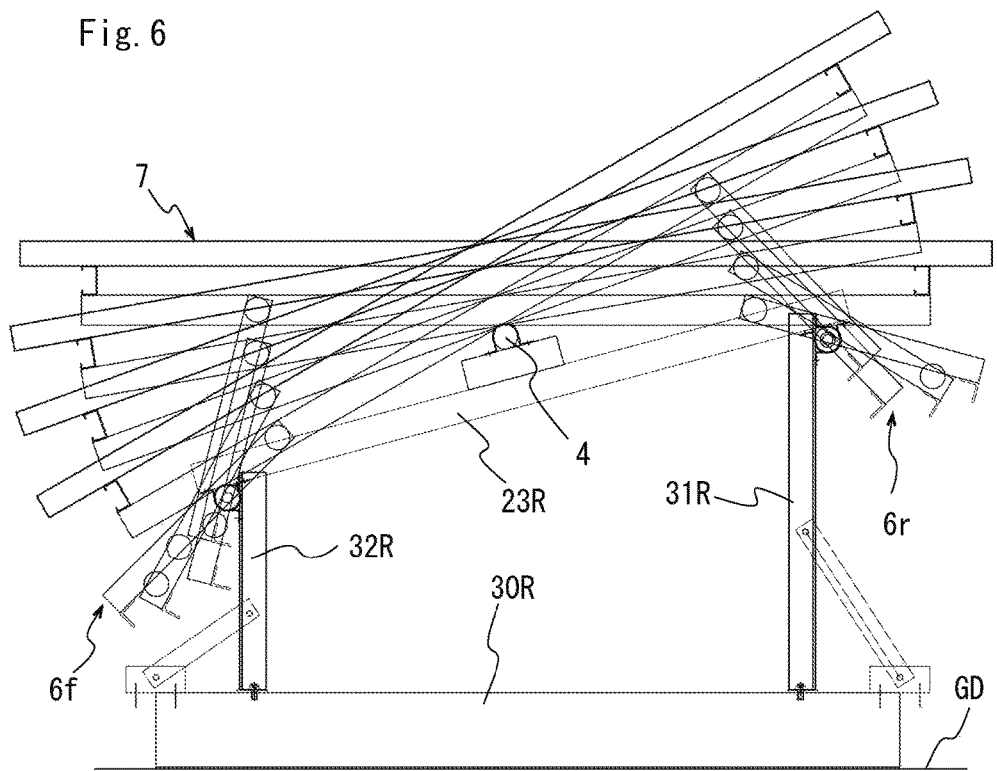
FIG. 6 is an explanatory views showing motions of the stopper members when the panel support member is tilted.

In an undersurface of each long plate-shaped portion 61*f* on the front side, engaging concave portions 63*f*1 and 63*f*2 and shallow engaging concave portions 64*f*1 and 64*f*2 are alternately formed as shown in FIG. 3. In an undersurface of each long plate-shaped portion 61*r*, engaging concave portions 63*r*1 and 63*r*2 and shallow engaging concave portions 64*r*1 and 64*r*2 are alternately formed as shown in FIG. 4. The respective engaging concave portions 63*f*1, 63*f*2, 63*r*1 and 63*r*2 are cut in a semicircular shape so as to be engaged with half circumferences of outer peripheries of the upper/lower horizontal members 21 and 22. The respective shallow engaging concave portions 64*f*1, 64*f*2, 64*r*1 and 64*r*2 are cut in a ¼ circumferential shape so as to be engaged with a portion not reaching a half circumference of the outer peripheral portion of each of the upper/lower horizontal members 21, 22, for example, a portion corresponding to a ¼ circumference. When the panel support member 5 tilts, undersurfaces of the long plate-shaped portions 61*f* and 61*r* contact upper peripheral surfaces of the upper/lower horizontal members 21 and 22 due to own weights of the stopper members 6*f* and 6*r*, and plate-shaped portions 61*f* and 61*r* relatively move in the contact state as shown in FIG. 6. Some of the engaging concave portions 63*f*1, 63*f*2, 63*r*1 and 63*r*2 are assigned to the upper/lower horizontal members 21 and 22, the stopper members 6*f* and 6*r* rotate around pins 65 at one end portions due to own weights and engaged with the upper/lower horizontal members 21 and 22. Positions where the upper/lower horizontal members 21 and 22 engage with the engaging concave portions 63*f*1, 63*f*2, 63*r*1 and 63*r*2 are set so as to correspond to predetermined tilt angles of the panel support member 5.

Specifically, when the tilt angle of the panel support member 5 is 0 (zero) degree, the upper horizontal member 21 is engaged with the engaging portion 63*r*1 at an upper position in the long plate-shaped portion 61*r* of the rear-side stopper member 6*r* as shown in FIG. 7. At that time, the lower-side horizontal member 22 is engaged with the shallow engaging portion 64*f*2 at a lower position in the long plate-shaped portion 61*f* of the front-side stopper member 6*f*. The setting in which the tilt angle of the panel support member 5 is 0 (zero) degree is performed, for example, for preventing the solar panel 7 and the panel support member 5 from being flapped by strong wind in a typhoon.

Figure 8:
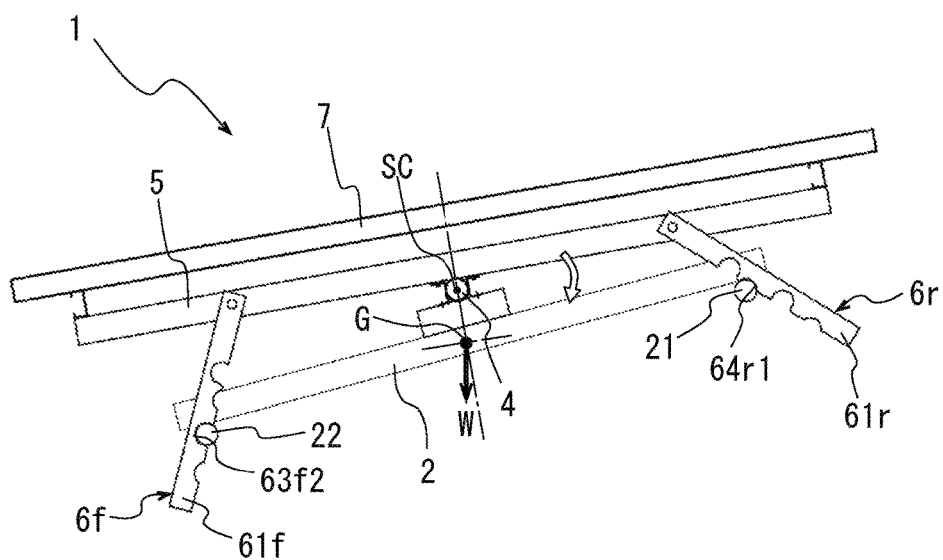
FIG. 8 is a view showing a case where the panel support member is supported at a tilt angle of 10 degrees.

When the tilt angle of the panel support member 5 is 10 degrees, the lower horizontal member 22 is engaged with the engaging concave portion 63*f*2 at a lower position in the long plate-shaped portion 61*f* of the front-side stopper member 6*f* as shown in FIG. 8. At that time, the upper horizontal member 21 is engaged with the shallow engaging concave portion 64*r*1 at an upper position in the long plate-shaped portion 61*r* of the rear-side stopper member 6*r*. The setting in which the tilt angle of the panel support member 5 is 10 degrees is performed, for example, in summer when the altitude of the sun is high.

Figure 9:
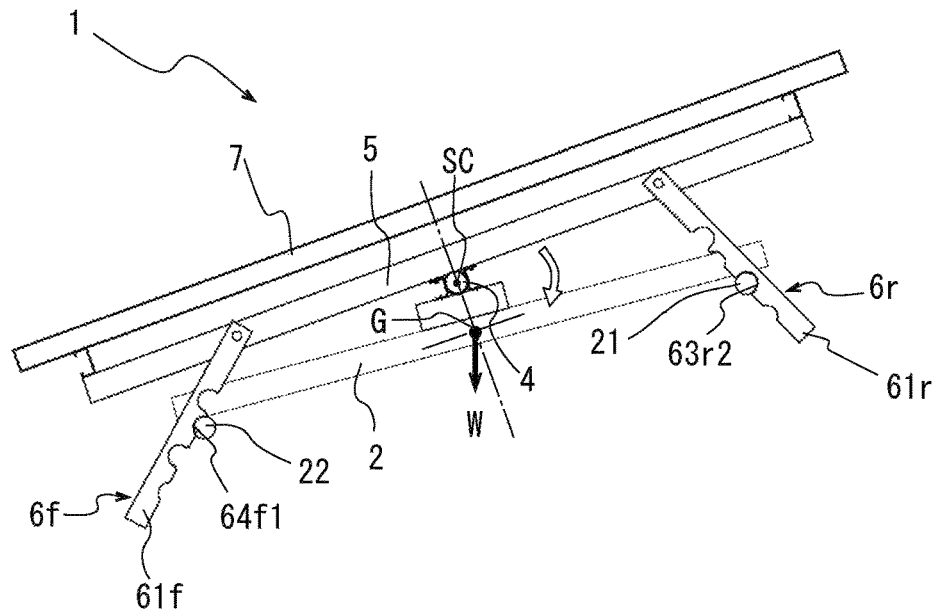
FIG. 9 is a view showing a case where the panel support member is supported at a tilt angle of 20 degrees.

When the tilt angle of the panel support member 5 is 20 degrees, the upper horizontal member 21 is engaged with the engaging concave portion 63*r*2 at a lower position in the long plate-shaped portion 61*r* of the rear-side stopper member 6*r* as shown in FIG. 9. At that time, the lower horizontal member 22 is engaged with the shallow engaging concave portion 64*f*1 at an upper position in the long plate-shaped portion 61*f* of the front-side stopper member 6*f*. The setting in which the tilt angle of the panel support member 5 is 20 degrees is performed, for example, in spring and fall when the altitude of the sun is intermediate.

Figure 10:
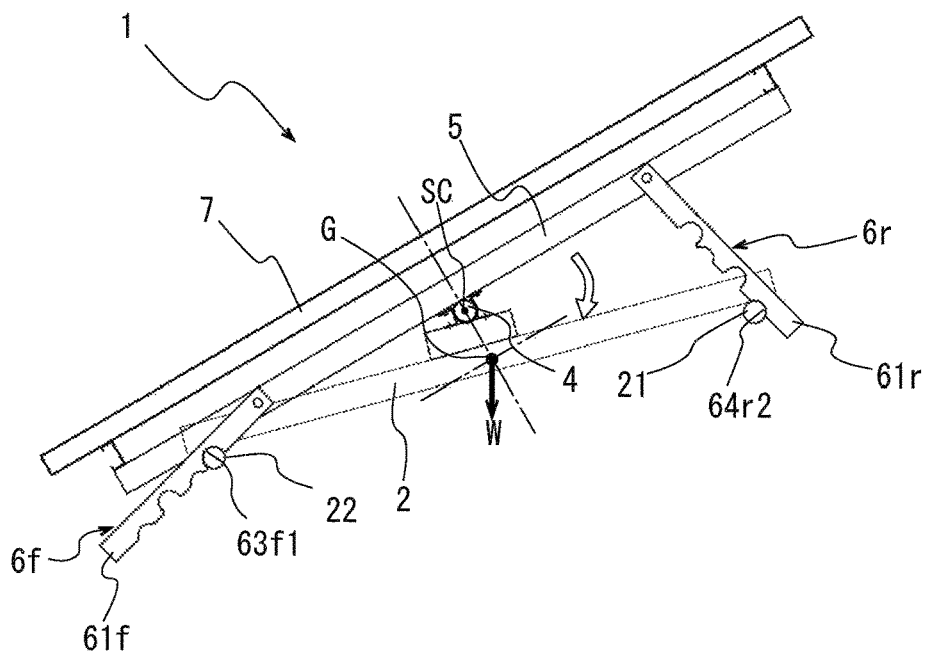
FIG. 10 is a view showing a case where the panel support member is supported at a tilt angle of 30 degrees.

When the tilt angle of the panel support member 5 is 30 degrees, the lower horizontal member 22 is engaged with the engaging concave portion 63*f*1 at an upper position in the long plate-shaped portion 61*f* of the front-side stopper member 6*f* as shown in FIG. 10. At that time, the upper horizontal member 21 is engaged with the shallow engaging concave portion 64*r*2 at a lower position in the long plate-shaped portion 61*r* of the rear-side stopper member 6*r*. The setting in which the tilt angle of the panel support member 5 is 30 degrees is performed, for example, in winter when the altitude of the sun is low.

(Operation)

Next, the operation of the mount for the solar panel according to the embodiment will be explained below.

In the embodiment, the combined center of gravity G on which the total weight W of the panel support member 5, the stopper members 6*f*, 6*r* and the solar panels 7 acts is set at a position just under a rotation center of the panel support member 5 when the tilt angle is 0 (zero) degree.

Accordingly, the panel support member 5 to which the solar panel 7 is fixed maintains a balanced state at a position where the tilt angle is 0 (zero) degree. When the panel support member 5 is supported at a tilted position, a rotational force works in a direction in which the tilt angle becomes 0 (zero) degree.

When the tilt angle is changed to 20 degree in the case where the panel support member 5 is supported at the tilt angle of 30 degrees as shown in FIG. 10, an operator disengages the engaging concave portion 63*f*1 at the upper position in the front-side stopper member 6*f* from the lower horizontal member 22. The panel support member 5 rotates clockwise in FIG. 10 based on the total weight W around a rotation center SC, and the upper horizontal member 21 is naturally disengaged from the shallow engaging concave portion 64*r*2 at the lower position in the rear-end stopper member 6*r*. Then, the upper horizontal member 21 is engaged with the engaging concave portion 63*r*2 at the lower position as shown in FIG. 9. At that time, the lower horizontal member 22 is engaged with the shallow engaging portion 64*f*1 at the upper position in the front-side stopper member 6*f*. Accordingly, the panel support member 5 is supported at the tilt angle of 20 degrees.

Next, when the tilt angle is changed to 10 degree in the case where the panel support member 5 is supported at the tilt angle of 20 degrees as shown in FIG. 9, the operator disengages the engaging concave portion 63*r*2 at the lower position in the rear-end stopper member 6*r* from the upper horizontal member 21. Then, the panel support member 5 rotates clockwise in FIG. 9 in the same manner and the lower horizontal member 22 is naturally disengaged from the shallow engaging concave portion 64*f*1 at the upper position in the front-side stopper member 6*f*. Then, the lower-end horizontal member 22 is engaged with the engaging concave portion 63*f*2 as shown in FIG. 8. At that time, the upper horizontal member 21 is engaged with the shallow engaging portion 64*r*1 at the upper position in the rear-side stopper member 6*r*. Accordingly, the panel support member 5 is supported at the tilt angle of 10 degrees.

To change the tilt angle of the panel support member 5 from 10 degrees to 0 (zero) degree can be executed in the same manner by disengaging the engaging concave portion 63*f*2 at the lower position of the front-side stopper member 6*f* from the lower horizontal member 22.

Next, when the tilt angle is changed to 10 degree in the case where the tilt angle of the panel support member 5 is supported at 0 (zero) degree as shown in FIG. 7, the operator disengages the engaging concave portion 63*r*1 at the upper position in the rear-side stopper member 6*r* from the upper horizontal member 21. In this case, the operator rotates the panel support member 5 in a counterclockwise direction in FIG. 7 by pulling up a rear-side end portion of the panel support member 5. The lower horizontal member 22 is disengaged from the shallow concave portion 64*f*2 at the lower position in the front-side stopper member 6*f*. Subsequently, the lower horizontal member 22 is engaged with the engaging concave portion 63*f*2 at the lower position as shown in FIG. 8. At that time, the upper horizontal member 21 is engaged with the shallow concave portion 64*r*1 at the upper position in the rear-side stopper member 6*r*. Accordingly, the panel support member 5 is supported at the tilt angle of 10 degrees. In this case, it is necessary that the operator pulls up the rear-side end portion of the panel support member 5. However, the panel support member 5 is supported at the central portions of the rotating bar members 51R and 51L, therefore, the operator can rotate the panel support member 5 with a small force.

Next, when the tilt angle is changed to 20 degree in the case where the tilt angle of the panel support member 5 is supported at 10 degrees as shown in FIG. 8, the operator disengages the engaging concave portion 63*f*2 at the lower position in the front side stopper member 6*f* from the lower horizontal member 22. In this case, the operator rotates the panel support member 5 in a counterclockwise direction in FIG. 8 by pressing down a front-side end portion of the panel support member 5. The upper horizontal member 21 is disengaged from the shallow concave portion 64*r*1 at the upper position in the rear-side stopper member 6*r*. Subsequently, the upper horizontal member 21 is engaged with the engaging concave portion 63*r*2 at the lower position as shown in FIG. 9. At that time, the lower horizontal member 22 is engaged with the shallow concave portion 64*f*1 at the upper position in the front-side stopper member 6*f*. Accordingly, the panel support member 5 is supported at the tilt angle of 20 degrees. In this case, it is necessary that the operator presses down the front-side end portion of the panel support member 5. However, the panel support member 5 is supported at the central portions of the rotating bar members 51R and 51L, therefore, the operator can rotate the panel support member 5 with a small force.

To change the tilt angle of the panel support member 5 from 20 degrees to 30 degrees can be executed in the same manner by disengaging the engaging concave portion 63*r*2 at the lower position in the rear-side stopper member 6*r* from the upper horizontal member 21.

In the present embodiment, the combined center of gravity G is set at the position just under the rotation center SC of the panel support member 5 when the tilt angle of the panel support member 5 is 0 (zero) degree, however, the present invention is not limited to this. For example, the combined center of gravity G may be set at the position just under the rotation center SC of the panel support member 5 when the tilt angle of the panel support member 5 is 30 degrees. When the tilt angle is set to 30 degrees as descried above, a rotating force works toward a position where the tilt angle is 30 degrees. For example, when the engaging concave portion 63*r*2 at the lower position in the rear-side stopper member 6*r* is disengaged from the upper horizontal member 21 that is engaged with the engaging concave portion 63*r*2 in the case where the panel support member 5 is supported at the tilt angle of 20 degrees, the panel support member 5 is rotated toward the tilt angle of degrees and the engaging concave portion 63*f*1 at the upper position in the front-side stopper member 6*f* is engaged with the lower horizontal member 22.

Moreover, the shallow engaging concave portions 64*f*1, 64*f*2, 64*r*1 and 64*r*2 are cut out so as to be engaged with a ¼ circumference of the outer peripheral portion of each of upper/lower horizontal members 21 and 22. However, the present invention is not limited to this, and the portions may be cut out so as to be engaged with a ⅙ circumference of the outer peripheral portion of each of upper/lower horizontal members 21 and 22. Furthermore, it is not always necessary to provide the shallow engaging concave portions 64*f*1, 64*f*2, 64*r*1 and 64*r*2, and only the engaging concave portions 63*f*1, 63*f*2, 63*r*1 and 63*r*2 may be provided.

As apparent from the above description, the mount for solar panel 1 according to the first embodiment includes the tilted support frame 2 having a pair of horizontal members (the upper horizontal member 21, the lower horizontal member 22) extending along the horizontal direction in parallel to each other with different heights and a pair of tilted members 23R and 23L arranged between the upper horizontal member 21 and the lower horizontal member 22 and extending in parallel to each other so as to be tilted in one side (front side), the fixed support member 3 fixing and supporting the tilted support frame 2 on the installation surface GD, the square-shaped panel support member 5 provided above the tilted support frame 2, on which the solar panel 7 is arranged and fixed, the support shaft 4 provided so as to extend along a direction parallel to the upper horizontal member 21 and the lower horizontal member 22 between the tilted support frame 2 and the panel support member 5 and supporting the panel support member 5 so as to rotate at central portions of two facing sides of the panel support member 5, and a pair of stopper members 6*f* and 6*r* respectively provided on both rotating end sides of the panel support member 5 so that one end portions rotate freely and having the engaging concave portions 63*f*1, 63*f*2, 63*r*1 and 63*r*2 lower sides of which open and are engaged with half circumferences of outer peripheries of the upper/lower horizontal members 21 and 22 from above in the rotating direction so as to be removed at positions corresponding to a predetermined tilt angle position of the panel support member 5.

According to the above, the panel support member 5 arranging and fixing the solar panel 7 is supported at the central portion so as to rotate by the support shaft 4 provided between the tilted support frame 2 and the panel support member 5. Accordingly, the operator can tilt the panel support member 5 at a necessary tilt angle without requiring a large force.

When the panel support member 5 is at a predetermined tilt angle, corresponding engaging concave portions 63*f*1, 63*f*2, 63*r*1 and 63*r*2 of the stopper members 6*f* and 6*r* are assigned to the upper horizontal member 21 or the lower horizontal member 22, and the stopper members 6*f* and 6*r* rotate downward and corresponding engaging concave portions 63*f*1, 63*f*2, 63*r*1 and 63*r*2 are engaged with the upper horizontal member 21 or the lower horizontal member 22. When the rotation of the panel support member 5 is desired to be stopped, the force in the direction along the axial direction of the stopper members 6*f* and 6*r* is acted on the stopper members 6*f* and 6*r* from the upper horizontal member 21 or the lower horizontal member 22. However, the engaging concave portions 63*f*1, 63*f*2, 63*r*1 and 63*r*2 of the stopper members 6*f* and 6*r* are engaged with the half circumference of the outer periphery of the upper horizontal member 21 or the lower horizontal member 22, therefore, the force acting on the axial direction of the stopper members 6*f* and 6*r* is received by opening edge portions of the engaging concave portions 63*f*1, 63*f*2, 63*r*1 and 63*r*2, and the engaging concave portions 63*f*1, 63*f*2, 63*r*1 and 63*r*2 are not disengaged from the upper horizontal member 21 or the lower horizontal member 22.

As described above, the operator can tilt the panel support member 5 easily without requiring a large force. Then, the solar panel 7 can be positively supported so as to face the direction in which the sunlight is received at the maximum.

Furthermore, in the mount for the solar panel 1, the pair of stopper members 6*f* and 6*r* are provided with at least one each of the engaging concave portions 63*f*1 and 63*r*1. When the engaging concave portion 63*f*1 of one stopper member 6*f* is engaged with the lower horizontal member 22, the engaging concave portion 63*r*1 of the other stopper member 6*r* is not engaged with the upper horizontal member 21.

According to the above, any one of the engaging concave portion 63*f*1 provided in one stopper member 6*f* and the engaging concave portion 63*r*1 provided in the other stopper member 6*r* in the pair of stopper member 6*f* and 6*r* is engaged, thereby supporting the panel support member 5 so as to be tilted to a predetermined position.

Also in the mount for the solar panel 1, the pair of stopper members 6*f* and 6*r* are provided with at least two each of the engaging concave portions 63*f*1, 63*f*2, 63*r*1 and 63*r*2. When the engaging concave portions 63*f*1/63*f*2 of one stopper member 6*f* is engaged with one lower horizontal member 22, the engaging concave portions 63*r*1/63*r*2 of the other stopper member 6*r* is not engaged with the upper horizontal member 21.

According to the above, the panel support member 5 can be supported at tilted positions of at least four places, and the solar panel 7 can be supported so as to be tilted in accordance with the altitude of the sun in respective four seasons or wind resistance positions in a typhoon.

Also in the mount for the solar panel 1, the stopper members 6*f* and 6*r* are provided with the engaging concave portions 63*f*1, 63*f*2, 63*r*1 and 63*r*2, and the shallow engaging concave portions 64*f*1, 64*f*2, 64*r*1 and 64*r*2 to be engaged with a portion not reaching a half circumference of the outer periphery of each the upper horizontal member 21 and the lower horizontal member 22 that are alternately arranged. When the engaging concave portions 63*f*1 or 63*f*2 of one stopper member 6*f* is engaged with the lower horizontal member 22 as one horizontal member, the shallow engaging concave portions 64*r*1 or 64*r*2 of the other stopper member 6*r* is engaged with the upper horizontal member 21 as the other horizontal member.

According to the above, when the engaging concave portions 63*f*1 or 63*f*2 of one stopper member 6*f* is engaged with the lower horizontal member 22, the upper horizontal member 21 corresponding to the shallow engaging concave portions 64*r*1 or 64*r*2 is fitted to the shallow engaging concave portions 64*r*1 or 64*r*2 to be stable. Then, the engaging concave portions 63*f* and 64*f*2 of one stopper member 6*f* are disengaged from the lower horizontal member 22, the force from the axial direction is added to the other stopper member 6*r* due to rotation of the panel support member 5, and engagement between the upper horizontal member 21 and the shallow engaging concave portions 64*r* or 64*r*2 is released. Subsequently, the upper horizontal member 21 is engaged with the engaging concave portions 63*r*1 or 63*r*2 positioned adjacent to the shallow engaging concave portions 64*r*1 and 64*r*2. As described above, the shallow engaging concave portions 64*r*1 and 64*r*2 of the other stopper member 6*r* can be disengaged from the upper horizontal member 21 only by disengaging the one stopper member 6*f* from the lower horizontal member 22, and a tilting operation can be performed from one side of the panel support member 5 easily.

Also in the mount 1 for the solar panel 1, the combined center of gravity G formed by combination of respective gravities of the panel support member 5, the stopper members 6*f*, 6*r* and the solar panel 7 arranged and fixed to the panel support member 5 is set just under the rotation center SC of the panel support member 5.

According to the above, the rotational force works on the panel support member 5 in a direction in which weights on both ends with the rotation center SC interposed therebetween are balanced. In the embodiment, the weights are balanced when the panel support member 5 is in the horizontal position. Accordingly, when the operator intends to change the position of the panel support member 5 from a steep slope position to a gentle slope position, the panel support member 5 is naturally rotated to allow the horizontal member (the upper horizontal member 21 or the lower horizontal member 22) to be engaged with the engaging concave portions 63*f*2, 63*r*1 and 63*r*2 at a next engagement position of the gentle slope only by performing the operation of disengaging the engaged engaging concave portions 63*f*1, 63*f*2 and 63*r*2 of the stopper member 6*f* and 6*r* from one horizontal member (upper horizontal member 21 and the lower horizontal member 22).

Second Embodiment

Next, a second embodiment of a mount for a solar panel will be explained with reference to FIG. 11 below.

Figure 11:
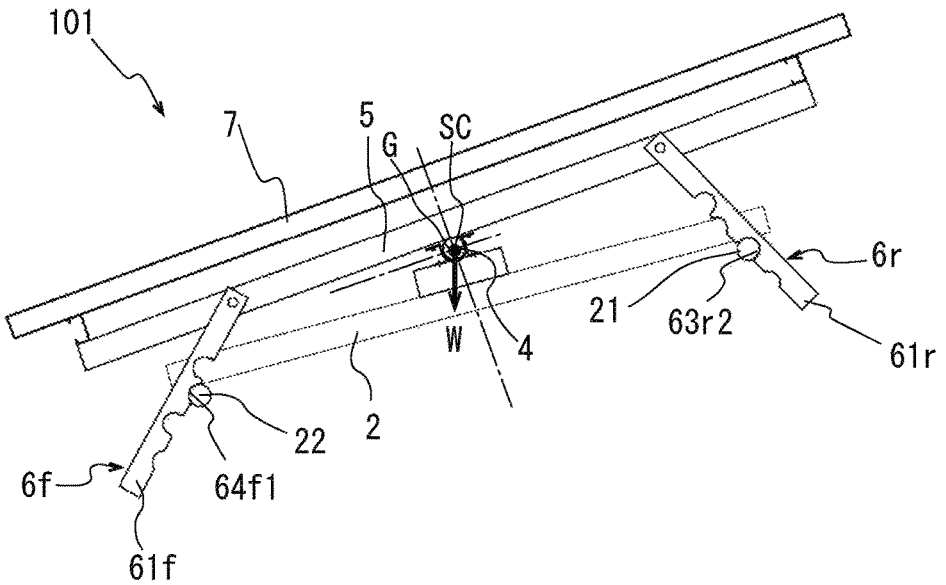
FIG. 11 is a view showing a case where the panel support member is supported at a tilt angle of 20 degrees in a mount for a solar panel according to a second embodiment.

A mount for a solar panel 101 according to the second embodiment differs from the first embodiment in a point that the position of the combined center of gravity G on which the total weight W of the panel support member 5, the stopper members 6*f*, 6*r* and the solar panel 7 acts is set so as to correspond to the rotation center SC as shown in FIG. 11. As a structure is the same in other points, the same symbols are added and explanation thereof is omitted.

In the mount for the solar panel 101 according to the second embodiment, the position of the combined center of gravity G on which the total weight W of the panel support member 5, the stopper members 6*f*, 6*r* and the solar panel 7 acts corresponds to the rotation center SC of the panel support member 5 as described above. Accordingly, the panel support member 5, the stopper members 6*f*, 6*r* and the solar panel 7 are constantly balanced with respect to the rotation center SC. Then, whichever angle the panel support member 5 is supported at, the operator can change the panel support member 5 to a desired tilt angle without adding a large force. Other operations and effects are the same as those of the first embodiment, the explanation thereof is omitted.

Third Embodiment

Next, a mount for a solar panel according to a third embodiment will be explained with reference to FIG. 12 and FIG. 13.

Figure 12:
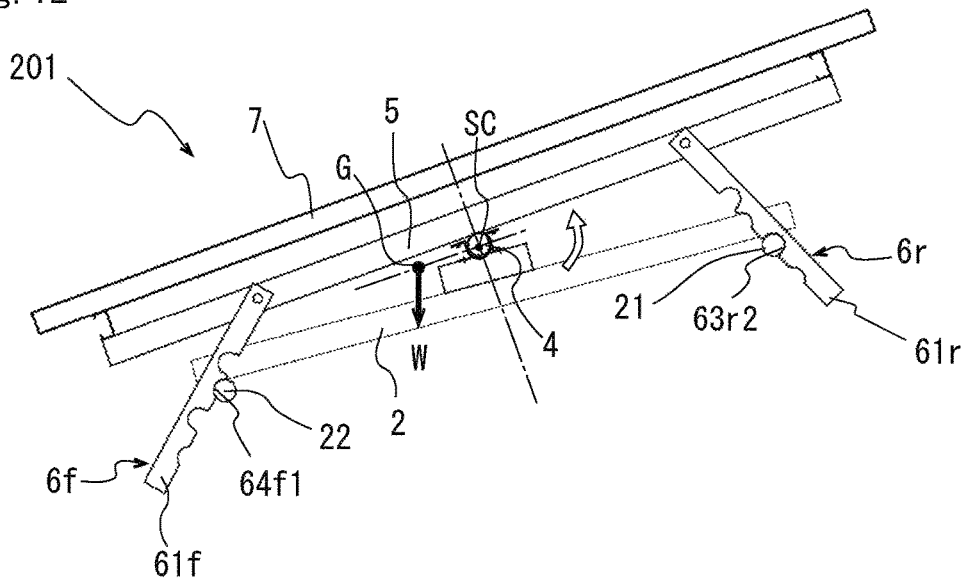
FIG. 12 is a view showing a case where the panel support member is supported at a tilt angle of 20 degrees in a mount for a solar panel according to a third embodiment.
Figure 13:
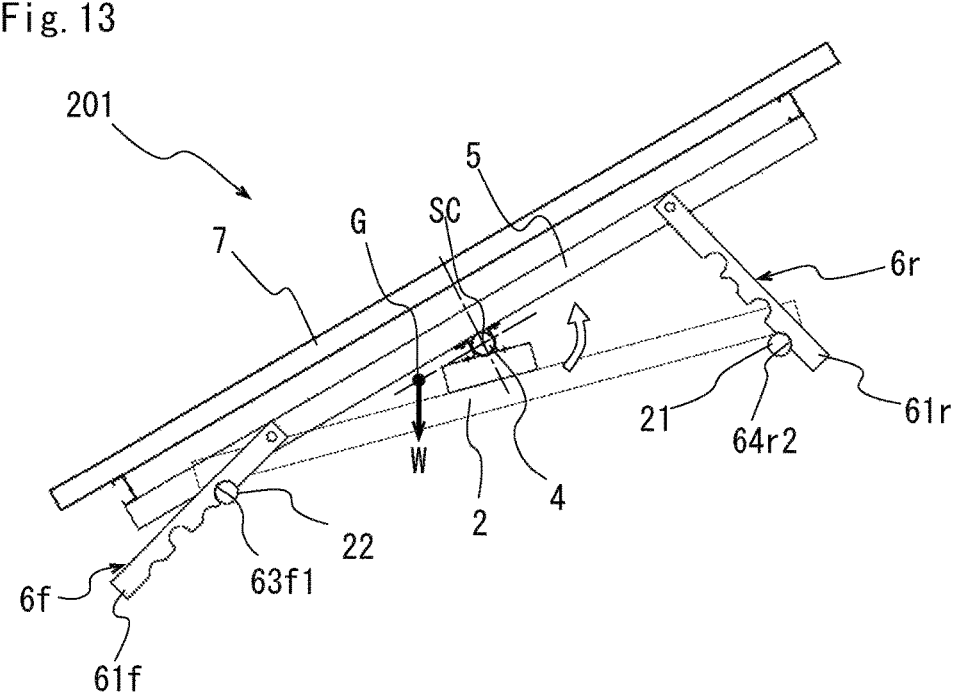
FIG. 13 is a view showing a case where the panel support member is supported at a tilt angle of 30 degrees in a mount for a solar panel according to the third embodiment.

A mount for a solar panel 201 according to the third embodiment differs from the first embodiment in a point that the position of the combined center of gravity G on which the total weight W of the panel support member 5, the stopper members 6*f*, 6*r* and the solar panel 7 acts is set in a position deviated to the front side of the rotation center SC as shown in FIG. 12. As the combined center of gravity G is set in the position deviated to the front side of the rotation center SC, a rotational force works in a direction of biasing the tilt angle to a steep angle on the panel support member 5 to which the solar panel 7 is fixed (in FIG. 12 and FIG. 13, the combined center of gravity G is expressed as a large deviation for making explanation easy to understand). As a structure is the same as the first embodiment in other points, the same symbols are added and explanation thereof is omitted.

As shown in FIG. 12, when the panel support member 5 is supported at the tilt angle of 20 degrees, the operator disengages the engaging concave portion 63*r*2 at the lower position in the rear-side stopper member 6*r* from the upper horizontal member 21.

The panel support member 5 rotates in the counterclockwise direction in FIG. 12, and the lower horizontal member 22 is disengaged from the shallow engaging concave portion 64*f*1 at the upper position in the front-side stopper member 6*f*. Then, the lower horizontal member 22 is engaged with the upper engaging concave portion 63*f*1 as shown in FIG. 13. At that time, the upper horizontal member 21 is engaged with the shallow engaging concave portion 64*r*2 at the lower position in the rear-side stopper member 6*r*. Accordingly, the panel support member 5 is supported at the tilt angle of 30 degrees.

As described above, in the mount for the solar panel 201 according to the third embodiment, when the tilt angle of the panel support member 5 is changed to a steep angle, the operator can change the tilt angle to a next tilt angle position only by disengaging the engaging concave portions 63*r*1, 63*r*2 or 63*f*2 of the stopper members 6*f* and 6*r* engaged with the upper horizontal member 21 or the lower horizontal member 22.

As apparent from the above description, in the mount for the solar panel 201 according to the third embodiment, the combined center of gravity G on which the total weight W of the panel support member 5, the stopper members 6*f*, 6*r* and the solar panel 7 arranged and fixed to the panel support member 5 acts is set to be deviated to a side to be lower by tilting when the panel support member 5 is rotated.

According to the above, the rotational force of rotating the panel support member 5 in a steeper direction works on the panel support member 5. Accordingly, when the position is changed from the gentle slope position to the steep slope position, the panel support member 5 is naturally rotated and allows the one horizontal member (the upper horizontal member 21 or the lower horizontal member 22) to be engaged with the engaging concave portions 63*f*1, 63*f*2 and the 63*r*2 only by performing the work of disengaging the engaged engaging concave portions 63*f*2, 63*r*1 and 63*r*2 of the stopper members 6*f* and 6*r* from the other horizontal member (the upper horizontal member 21 or the lower horizontal member 22).

Fourth Embodiment

Next, a fourth embodiment of a mount for a solar panel will be explained with reference to FIG. 14.

A mount for a solar panel 301 according to the fourth embodiment differs from the first embodiment in a point that a gravity-center position moving device 8 is provided in the panel support member 5. As other components are the same as those of the first embodiment, the same symbols are added and the explanation thereof is omitted.

The gravity-center position moving device 8 includes a guide rail 81, a weight 82 as a weight part sliding along the guide rail 81 and a positioning stopper (not shown) for holding a position of the weight 82 on the guide rail 81. The guide rail 81 is provided so as to extend along a longitudinal direction of the rotating bar member 51R on a side surface of the rotating bar member 51R of the panel support member 5. The guide rail 81 extends over both sides of the front side (corresponding to one side) and the rear side (corresponding to the other side) of the panel support member 5 with the support shaft 4 interposed in the center (rotation center SC). The guide rail 81 is formed of, for example, a stainless steel material formed in an H-shape in cross section, in which engaging grooves (not shown) extending along the longitudinal direction are provided on both side surfaces. A back surface of the guide rail 81 is fixed to the side surface of the rotating bar member 51R.

The weight 82 is formed in an approximately rectangular parallelepiped shape, in which engaging projections (not shown) to be engaged with the engaging grooves on the side surfaces of the guide rail 81 respectively so as to slide are provided in an upper part and a lower part on a back surface side. The weight 82 is stopped at a front-side position F, a central position O and a rear-side position R on the guide rail 81 by the positioning stopper operating by the operation of the operator. To move the weight 82 from the front-side position F to the central position O, and from the rear-side position R to the central position O correspond to the approach to the rotation center SC. To move the weight 82 from the central position O to the front-side position F or the rear-side position R corresponds to the separation from the rotation center SC.

Figure 14:
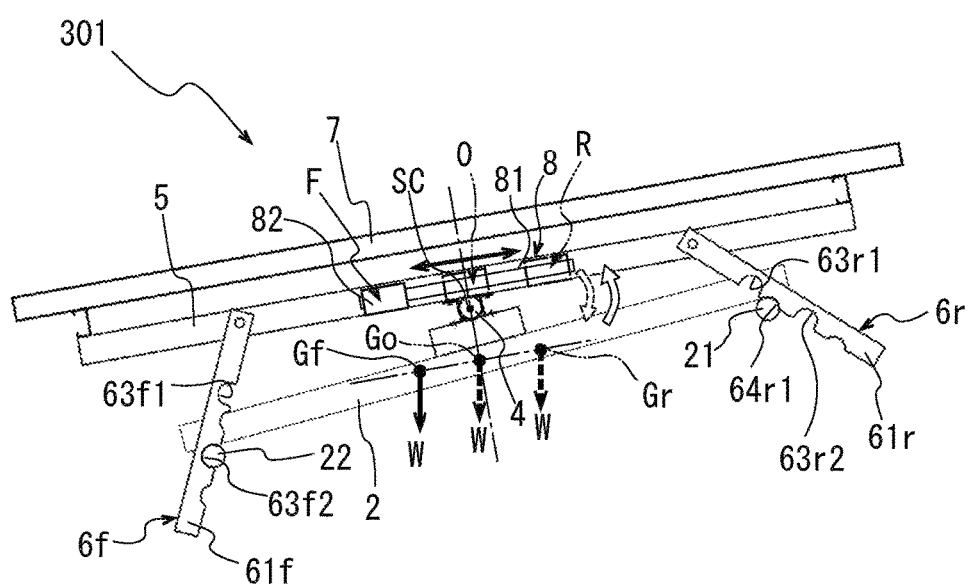
FIG. 14 is an outline view of a mount for a solar panel according to a fourth embodiment.

When the weight 82 is positioned in the front-side position F, the combined center of gravity G moves to a front-side combined center of gravity Gf, and a rotational force rotating in the counterclockwise direction in FIG. 14 is generated in the panel support member 5 by the front-side combined center of gravity Gf.

When the weight 82 is positioned in the central position O, the combined center of gravity moves to a central combined center of gravity Go, and a rotational force in a direction of horizontally holding the panel support member 5 is generated by the central combined center of gravity Go.

When the weight 82 is positioned in the rear-side position R, the combined center of gravity moves to a rear-side combined center of gravity Gr, and a rotational force rotating in the clockwise direction in FIG. 14 is generated in the panel support member 5 by the rear-side combined center of gravity Gr.

(Operation)

When the tilt angle is changed to a steeper tilt angle (for example, 20 degrees) than a tilt angle (for example, 10 degrees) at which the panel support member 5 is supported at present, the operator positions the weight 82 to the front-side position F by the gravity-center position moving device 8. Accordingly, a rotational force rotating toward the steep tilt angle is generated in the panel support member 5, and the panel support member 5 rotates to the tilt angle of 20 degrees steeper than the current angle only by releasing the engagement between the engaged engaging concaving portion 63f2 and the lower horizontal member 22. When the panel support member 5 rotates to the tilt angle position of 20 degrees that is steeper than the current angle, the next engaging concave portion 63r2 is engaged with the upper horizontal member 21 in the rear-side stopper member 6r, and the panel support member 5 is supported at the position of the tilt angle of 20 degrees.

When the tilt angle is changed to a gentler tilt angle (for example, 0 (zero) degree) than a tilt angle (for example, 10 degrees) at which the panel support member 5 is supported at present, the operator positions the weight 82 to the central position O or the rear-side position R by the gravity-center position moving device 8. Accordingly, a rotational force rotating toward the gentle tilt angle (0 (zero) degree) is generated in the panel support member 5, and the panel support member 5 rotates to the tilt angle of 0 (zero) degree gentler than the current angle only by releasing the engagement between the engaged engaging concaving portion 63f2 and the lower horizontal member 22 in the front-side stopper member 6f. When the panel support member 5 rotates to the position of the tilt angle position of 0 (zero) degree that is gentler than the current angle, the next engaging concave portion 63r1 is engaged with the upper horizontal member 21 in the rear-side stopper member 6r, and the panel support member 5 is supported at the predetermined position of the tilt angle of 0 (zero) degree gentler than the current angle.

As described above, when the tilt angle of the panel support member 5 is changed to a steeper tilt angle than the current tilt angle, the operator positions the weight in the front-side position F by the gravity-center position moving device 8. When the tilt angle of the panel support member 5 is changed to a gentler tilt angle than the current tilt angle, the operator positions the weight 82 in the central position O or the rear-side position R. Accordingly, the operator can change the tilt angle of the panel support member 5 easily without performing complicated operations in which the end portion of the panel support member 5 is pulled up or pressed down.

As apparent from the above description, in the mount for the solar panel 301 according to the fourth embodiment, the panel support member 5 is provided with the gravity-center position moving device 8 capable of moving the position of the combined center of gravity G to any of one side or the other side of both sides with the rotation center SC interposed therebetween by allowing the weight part (weight 82) to be close to or away from the rotation center SC.

According to the above, the direction of the rotational force acting on the panel support member 5 is operated by moving the position of the combined center of gravity G by the gravity-center position moving device 8. According to the structure, the panel support member 5 can be rotated in a necessary rotation direction to be changed to a desired tilt angle easily without rotating the panel support member 5 manually by the operator.

Though the gravity-center position moving device 8 is provided in the central position of the rotating bar member 51R of the panel support member 5 in the above embodiment, the present invention is not limited to this. For example, the gravity-center position moving device 8 may be provided at an end portion on one side of the panel support member 5. In this case, the balance of the panel support member 5 is set so that a side where the gravity-center position moving device 8 is provided ascends when the weight is positioned to be close to the rotation center's side, and so that the side where the gravity-center position moving device 8 is provided descends when the weight is positioned to be away from the rotation center.

The stopper members 6f and 6r are supported so that upper portions rotate freely, which are arranged so that undersurfaces of the long plate-shaped portions abut on the horizontal members in the tilted state. Then, the engaging concave portions are engaged with the horizontal members due to own weights of the stopper members. However, the present invention is not limited to the structure in which the stopper members rotate due to own weights, and for example, a spring member for biasing the stopper member to a rotating direction may be provided.

As described above, specific structures described in the above embodiments are just represented as examples of the present invention. The present invention is not limited to such specific structures and is capable of adopting various embodiments within a scope not departing from the gist of the present invention.

INDUSTRIAL APPLICABILITY

The present invention can be applied to solar panel facilities in which the tilt angle of the solar panel is required to be changed many times or frequently.

The invention claimed is:

1. A mount for a solar panel comprising:
   a tilted support frame having a pair of horizontal members extending along a horizontal direction in parallel to each other with different heights and a pair of tilted members arranged between the horizontal members and extending in parallel to each other so as to be-tilted in one side;
   a fixed support member fixing and supporting the tilted support frame on an installation surface;
   a square-shaped panel support member provided above the tilted support frame, on which a solar panel is arranged and fixed;

a support shaft provided so as to extend along a direction parallel to the horizontal members between the tilted support frame and the panel support member and supporting the panel support member so as to rotate at a central portion portions of two facing sides of the panel support member; and a pair of stopper members respectively provided on each rotating end side of the panel support member so that one end portion of each of the pair of stopper members rotates freely and wherein the pair of stopper members include engaging concave portions having open lower sides engaging with half circumferences of outer peripheries of the horizontal members from above in a rotating direction so as to be removed at positions corresponding to a predetermined tilt angle position of the panel support member.

2. The mount for the solar panel according to claim 1, wherein the pair of stopper members are provided with at least one each of the engaging concave portions, and when the engaging concave portion of one stopper member is engaged with one horizontal member, the engaging concave portion of the other stopper member is not engaged with the other horizontal member.

3. The mount for the solar panel according to claim 1, wherein the pair of stopper members are provided with at least two each of the engaging concave portions, and when the engaging concave portion of one stopper member is engaged with one horizontal member, the engaging concave portion of the other stopper member is not engaged with the other horizontal member.

4. The mount for the solar panel according to claim 3, wherein the stopper member is provided with the engaging concave portions and shallow engaging concave portions not enough to be engaged with a half circumference of the outer periphery of the horizontal member being arranged alternately, and when the engaging concave portion of one stopper member is engaged with one horizontal member, the shallow engaging concave portion of the other stopper member is engaged with the other horizontal member.

5. The mount for the solar panel according to claim 1, wherein a position of a combined center of gravity formed by combining respective centers of gravity in the panel support member, the stopper members and the solar panel arranged and fixed to the panel support member corresponds to a rotation center of the panel support member.

6. The mount for the solar panel according to claim 1, wherein a combined center of gravity formed by combining respective centers of gravity in the panel support member, the stopper members and the solar panel arranged and fixed to the panel support member is set just under a rotation center of the panel support member.

7. The mount for the solar panel according to claim 1, wherein a combined center of gravity formed by combining respective centers of gravity in the panel support member, the stopper members and the solar panel arranged and fixed to the panel support member is set to be deviated to a side to be lower by tilting when the panel support member is rotated.

8. The mount for the solar panel according to claim 1, wherein the panel support member is provided with a gravity-center position moving device capable of moving a position of a combined center of gravity formed by combining respective centers of gravity in the panel support member, the stopper members and the solar panel arranged and fixed to the panel support member to any of one side and the other side of both sides with the rotation center interposed therebetween by allowing a weight part to be close to or away from the rotation center.

9. The mount for the solar panel according to claim 2, wherein a position of a combined center of gravity formed by combining respective centers of gravity in the panel support member, the stopper members and the solar panel arranged and fixed to the panel support member corresponds to a rotation center of the panel support member.

10. The mount for the solar panel according to claim 3, wherein a position of a combined center of gravity formed by combining respective centers of gravity in the panel support member, the stopper members and the solar panel arranged and fixed to the panel support member corresponds to a rotation center of the panel support member.

11. The mount for the solar panel according to claim 4, wherein a position of a combined center of gravity formed by combining respective centers of gravity in the panel support member, the stopper members and the solar panel arranged and fixed to the panel support member corresponds to a rotation center of the panel support member.

12. The mount for the solar panel according to claim 2, wherein a combined center of gravity formed by combining respective centers of gravity in the panel support member, the stopper members and the solar panel arranged and fixed to the panel support member is set just under a rotation center of the panel support member.

13. The mount for the solar panel according to claim 3, wherein a combined center of gravity formed by combining respective centers of gravity in the panel support member, the stopper members and the solar panel arranged and fixed to the panel support member is set just under a rotation center of the panel support member.

14. The mount for the solar panel according to claim 4, wherein a combined center of gravity formed by combining respective centers of gravity in the panel support member, the stopper members and the solar panel arranged and fixed to the panel support member is set just under a rotation center of the panel support member.

15. The mount for the solar panel according to claim 2, wherein a combined center of gravity formed by combining respective centers of gravity in the panel support member, the stopper members and the solar panel arranged and fixed to the panel support member is set to be deviated to a side to be lower by tilting when the panel support member is rotated.

16. The mount for the solar panel according to claim 3, wherein a combined center of gravity formed by combining respective centers of gravity in the panel support member, the stopper members and the solar panel arranged and fixed to the panel support member is set to be deviated to a side to be lower by tilting when the panel support member is rotated.

17. The mount for the solar panel according to claim 4, wherein a combined center of gravity formed by combining respective centers of gravity in the panel support member, the stopper members and the solar panel arranged and fixed to the panel support member is set to be deviated to a side to be lower by tilting when the panel support member is rotated.

18. The mount for the solar panel according to claim 2, wherein the panel support member is provided with a gravity-center position moving device capable of moving a position of a combined center of gravity formed by combining respective centers of gravity in the panel support member, the stopper members and the solar panel arranged and fixed to the panel support member to any of one side and the other side of both sides with the rotation center interposed therebetween by allowing a weight part to be close to or away from the rotation center.

19. The mount for the solar panel according to claim 3, wherein the panel support member is provided with a gravity-center position moving device capable of moving a position of a combined center of gravity formed by combining respective centers of gravity in the panel support member, the stopper members and the solar panel arranged and fixed to the panel support member to any of one side and the other side of both sides with the rotation center interposed therebetween by allowing a weight part to be close to or away from the rotation center.

20. The mount for the solar panel according to claim 4, wherein the panel support member is provided with a gravity-center position moving device capable of moving a position of a combined center of gravity formed by combining respective centers of gravity in the panel support member, the stopper members and the solar panel arranged and fixed to the panel support member to any of one side and the other side of both sides with the rotation center interposed therebetween by allowing a weight part to be close to or away from the rotation center.

* * * * *